United States Patent [19]

Kunz et al.

[11] 4,090,575
[45] May 23, 1978

[54] WEIGHING APPARATUS OF THE ELECTROMAGNETIC LOAD COMPENSATION TYPE INCLUDING PROTECTIVE SHIELD MEANS

[75] Inventors: Peter Kunz, Tann-Ruti; Felix Strobel, Greifensee, both of Switzerland

[73] Assignee: Mettler Instrumente AG, Greifensee, Switzerland

[21] Appl. No.: 766,759

[22] Filed: Feb. 8, 1977

[30] Foreign Application Priority Data

Apr. 1, 1976 Switzerland .................. 4056/76

[51] Int. Cl.² .................. G01G 3/14; G01G 7/00
[52] U.S. Cl. .................. 177/210 EM; 177/212
[58] Field of Search .................. 177/210 EM, 212

[56] References Cited

U.S. PATENT DOCUMENTS

| 1,953,819 | 4/1934 | Payne | 177/210 EM |
| 3,519,095 | 7/1970 | Tomes | 177/212 X |

Primary Examiner—George H. Miller, Jr.
Attorney, Agent, or Firm—Lawrence E. Laubscher

[57] ABSTRACT

Weighing apparatus of the electromagnetic load compensation type is disclosed including protective shield means for protecting an asymmetrically arranged compensation coil against stray magnetic-flux and particles of contaminants, thereby to improve the accuracy of load measurement.

7 Claims, 6 Drawing Figures

WEIGHING APPARATUS OF THE ELECTROMAGNETIC LOAD COMPENSATION TYPE INCLUDING PROTECTIVE SHIELD MEANS

REFERENCE TO COMPANION APPLICATION

This application is a companion application to the copending application Ser. No. 776,760 filed Feb. 8, 1977, [Case No. 1098], entitled "Weighing Apparatus Including Lever-Connected Compensation Coil Means".

STATEMENT OF THE INVENTION

The present invention relates to an improved weighing apparatus of the electromagnetic load compensation type including an annular compensation coil arranged asymmetrically within the open end of an annular air gap defined in the permanent magnet means, characterized by the provision of a protective shield member connected in spaced relation across the open end of the air gap, thereby to protect the compensation coil from the effect of stray magnetic flux and particles of impurities, such as dust, dirt and other contaminates. Owing to the asymmetric arrangement of the coil, a more compact weighing apparatus is produced having greatly reduced dimensions.

BRIEF DESCRIPTION OF THE PRIOR ART

Weighing systems of the electromagnetic load compensation type are well known in the patented prior art, as evidenced by the U.S. Pat. to Baumgartner No. 3,677,357, Strobel 3,688,854, Kunz Nos. 3,786,678 and 3,786,883, Strobel et al 3,789,937 and Baumann et al 3,816,156, among others. In these known weighing systems, a compensation coil is connected with the movable pan carrier for displacement relative to stationary permanent magnet means. When the pan carrier is displaced by the application of load thereto from an initial no-load position, compensation current is supplied to the compensation coil to generate an electromagnetic force by reaction with the magnetic flux of the permanent magnet means to return the pan carrier to its initial no-load position, the magnitude of the compensation current being measured to afford an indication of the magnitude of the load being weighed.

In the companion patent application referred to above, it was proposed to provide an asymmetric weighing apparatus in which the compensation coil is asymmetrically arranged relative to the permanent magnet means, thereby to reduce the overall size of the apparatus.

As compared to the known symmetrical arrangements—in which the coil is at least approximately in the middle of the permanent magnet system—the asymmetrical arrangement, among other things, offers the advantage that a lower structural height is achieved. This is counterbalanced by the disadvantage that weighing errors may arise when one utilizes the low structural height because of the open exposed magnetic field. If the coil is at the lower end of the permanent magnet system, these errors can arise because ferromagnetic objects may be present adjacent or under the scale (for example, sheet metal on work table). If the coil is arranged at the upper end of the permanent magnet system, such a disturbing reciprocal effect can result between a ferromagnetic material to be weighed in the pan and the magnetic field.

This problem in most cases did not exist in the prior symmetrical systems, because the structural height of the weighing apparatus as a whole was so large that the magnetic field lines ran practically entirely within the interior of the scale.

The present invention was developed to avoid the above and other drawbacks of the known devices.

SUMMARY OF THE INVENTION

The primary object of the present invention is to provide a compact electromagnetic load compensation weighing apparatus of the asymmetric type including protective shield means for screening the environment of the apparatus from stray magnetic flux and protecting the interior from particles of impurities such as dirt, dust and other contaminates. In accordance with an advantage of the invention, the portions of the weighing apparatus which are screened by the protective shield—which is generally formed of a sheet of ferromagnetic material—are given additional mechanical protection against damage and furthermore, foreign ferromagnetic particles are prevented from being attracted into the magnetic field of the permanent magnet means.

In accordance with a more specific object of the invention, the permanent magnet means includes a core member about which is concentrically arranged a ferromagnetic annular member, which members are contained between horizontal upper cover and lower base plates one of which contains the annular air gap in which the compensation coil is arranged. The compensation coil is mounted on the flange portion of a dish-shaped coil carrier member. In one embodiment, the air gap is contained in the base plate, the coil carrier member being arranged beneath the base plate with the flange portion thereof extending upwardly into the air gap. One-arm lever means connected with the permanent magnet means by suspension bearings serve to connect the coil carrier member with the pan carrier member. In a second embodiment, the air gap is contained in the cover plate, the coil carrier member being arranged above the cover plate with the flange portion thereof extending downwardly into the air gap. Two-arm lever means connected with the permanent magnet means by suspension bearing means serve to connect the coil carrier member with the pan carrier member.

In accordance with a more specific object of the invention, the protective shield means are formed of a suitable ferromagnetic material, such as an aluminum, nickel, cobalt and iron alloy, or a nickel-iron alloy, for example, or thermally treated soft iron (similar to the iron from which are formed the components of the permanent magnet). Relatively inexpensive deep-drawn iron sheets could also be used as the protective shields. Owing to its magnetic conductivity, the protective shield means serves to change the free stray field of the pot-type permanent magnet means in the vicinity of the air gap to a virtually closed magnetic flux path through the cover or base plates.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
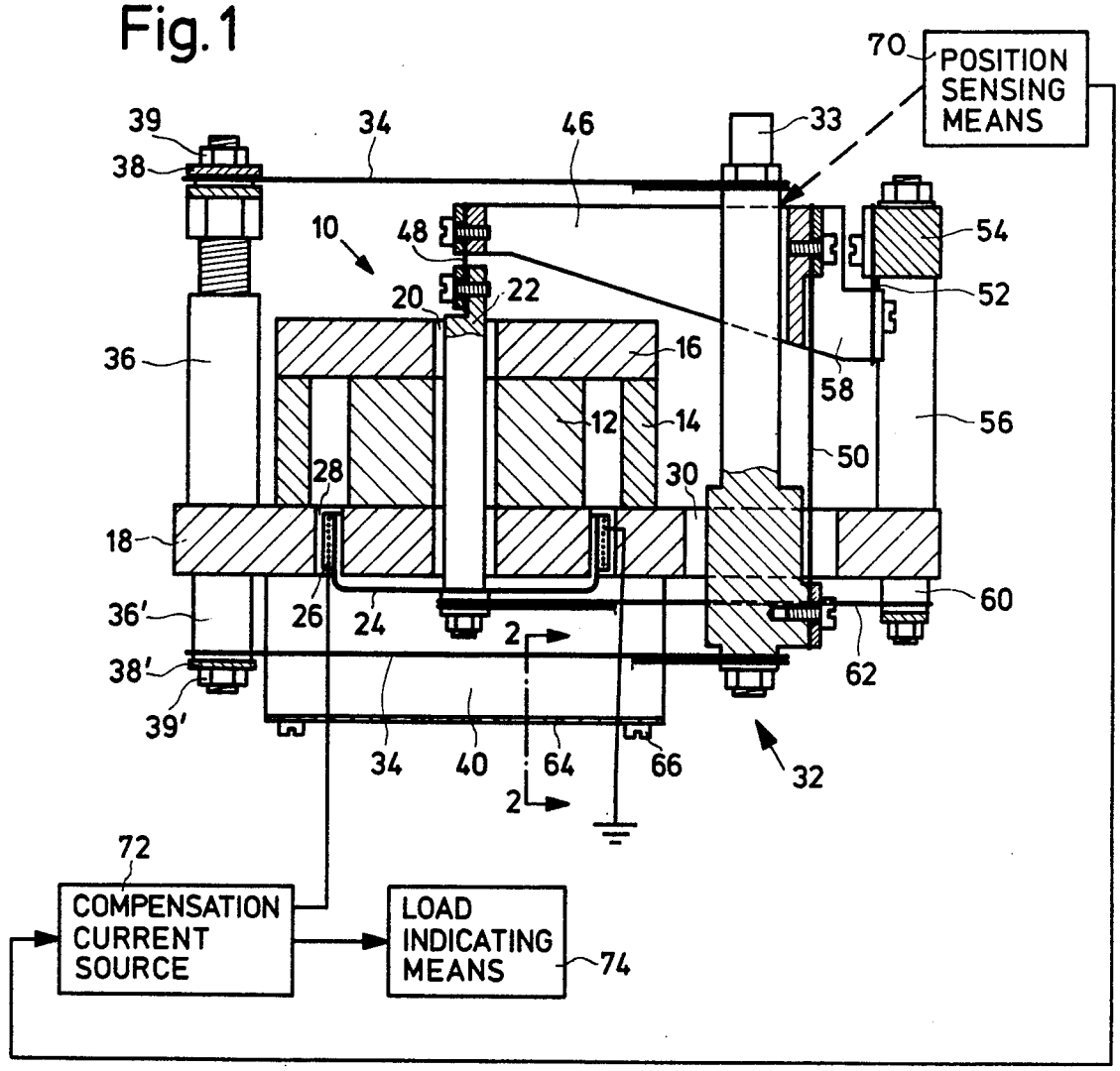
FIG. 1 is a longitudinal sectional view of a one-arm lever embodiment of the present invention.
Figure 2:
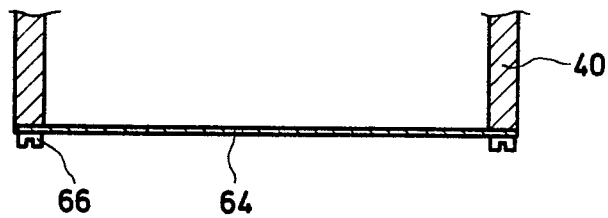
FIG. 2 is a sectional view taken along line 2—2 of FIG. 1.
Figure 3:
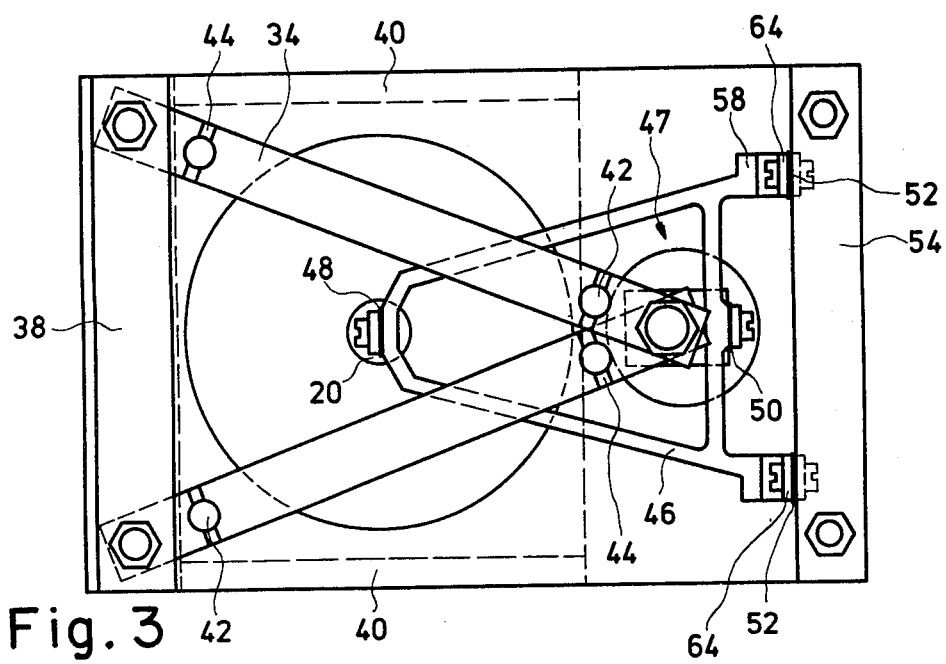
FIG. 3 is a top view of the apparatus of FIG. 1.

Referring first more particularly to the one-arm embodiment of FIGS. 1-3, the weighing apparatus of the present invention includes permanent magnet means 10 of the pot type including a core member 12, a ferromagnetic annular member 14 arranged concentrically in spaced relation about the core member 12, a ferromagnetic upper cover plate 16, and a ferromagnetic base plate 18. A vertical central bore 20 extends vertically through the permanent magnet means 10, and the base plate 18 contains an annular air gap 28 which receives for axial movement the compensation coil 26. The compensation coil 26 is arranged on the flange portion of a dish-shaped coil carrier member 24 which is normally formed of a suitable synthetic plastic material. The coil carrier rod 22 is connected at its lower end with the central portion of the dish-shaped member 24, and extends upwardly through the central bore 20. The scale pan carrier member 32 extends vertically upwardly through an opening 30 contained in the base plate 18, the upper end of the scale pan carrier member 32 being provided with a pin 33 for connection with the weighing pan (not shown). The scale pan carrier member 32 is guided for vertical movement relative to the ferromagnet means 10 by upper and lower resilient guide means 34. Each of the upper and lower guide means 34 has the configuration of an isosceles triangle as shown in FIG. 3, the apex portion of the triangle being connected with the corresponding end of the scale pan carrier member 32. As its left-hand end, the upper guide members 34 are connected with a pair of vertical columns 36 that are bolted to an extension of the base plate 18, a horizontal stabilizing metal strip 38 being connected between the upper ends of the bolts associated with the vertical columns 36. Similarly, the left hand ends of the lower resilient guide means 34 are connected with the lower ends of vertical columns 36' that are stabilized by the horizontal metal strip 38'. Similarly, the lower end of the coil carrier rod 22 may be connected with the apex portion of resilient lower guide means 62 that define an isosceles triangle the base portion of which is connected with base plate 18 by short vertical column means 60. Vertical column means 56 support a horizontal support member 54 in spaced relation above the base plate 18, whereby the horizontal support member 54, which extends transversely of the weighing apparatus, is rigidly connected with the base plate 18. Suspended at one end from the horizontal support member 54 by suspension bearing straps 52 is a one-arm lever 46 the other end of which is connected with the upper end of the coil carrier rod 22 by a suspension bearing means 48. As shown in FIG. 3, the one-arm lever 46 has in horizontal cross section the configuration of an isosceles triangle the apex portion of which is connected with the coil carrier rod 22 by the suspension bearing 48, and the base portion of which has a pair of longitudinal extensions 58 that are suspended from the horizontal support 54 by the suspension bearings 52. The scale pan member 32 is suspended from an intermediate portion of th one-arm lever 46 by means of the suspension bearing 50.

In accordance with the present invention, a protective shield 64 formed of ferromagnetic material is suspended in spaced relation beneath the base plate 18, which protective shield extends horizontally completely beneath the annular air gap 28 contained in the base plate 18. In the illustrated embodiment, the protective shield 64 is formed of a suitable ferromagnetic material such as an alloy of aluminum, nickel, cobalt and iron, a nickel-iron alloy, thermally treated soft iron, or the like. The protective shield is supported beneath the base plate by a pair of longitudinally extending, laterally spaced bars 40 that are also formed of a suitable ferromagnetic material.

OPERATION

In operation, when load is supplied to the scale pan connected with the upper end of the scale pan carrier 32, the scale pan carrier is actually displaced downwardly against the biasing force of the resilient guide means 34, and lever 46 is caused to pivot downwardly about the horizontal pivot axis defined by the suspension bearing means 52. Consequently, the compensation coil 26 is displaced downwardly in the air gap 28. The position sensing means 70 detects this displacement of the scale pan carrier member from its initial no-load position and transmits a signal to the compensation current source 72 to supply compensating current to the compensation coil 26 to generate an electromagnetic force by reaction with the flux of the permanent magnet means 10 and tends to return the coil 26 and the scale pan member 32 upwardly toward their initial no-load position. The amount of compensation current supplied to the compensating coil 26 is indicated by the load indicating means 74, thereby giving a visible indication of the magnitude of the load being weighed. It will be apparent that the protective shield means 64 serves to shield the air gap 28 and the compensation coil 26 arranged therein from particles of impurities such as dust, dirt and other contaminants, and also against the magnetic attraction of ferromagnetic particles by the magnetic field of the permanent magnet means. The shield 64 also serves to screen the air gap and the compensation coil from stray magnetic fields. Since the shield 64 is connected in magnetic circuit with the magnetic flux from the permanent magnet means 10, stray flux from the open lower end of the permanent magnet means is also alleviated.

Figure 6:
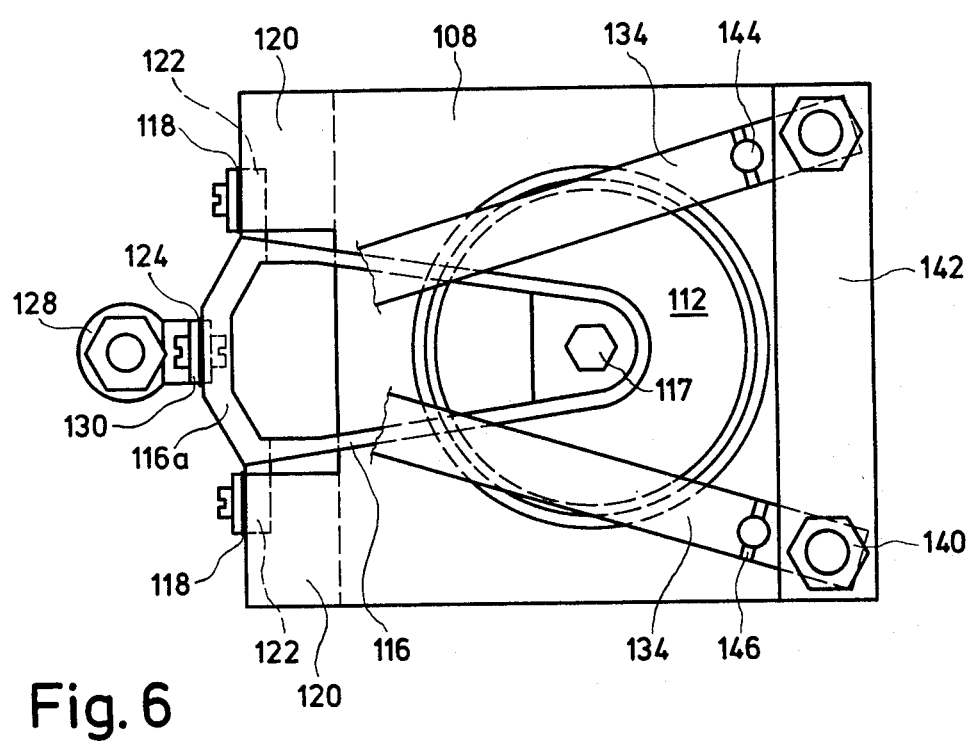
FIG. 6 is a top view of the apparatus of FIG. 4.
Figure 4:
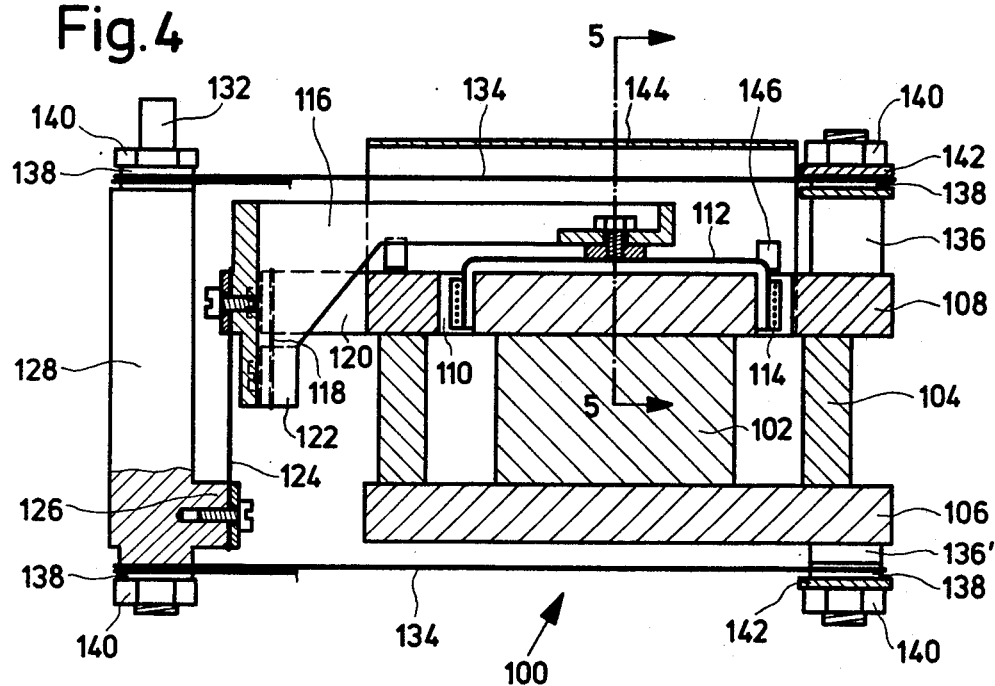
FIG. 4 is a longitudinal sectional view of a two-arm lever embodiment of the present invention.
Figure 5:
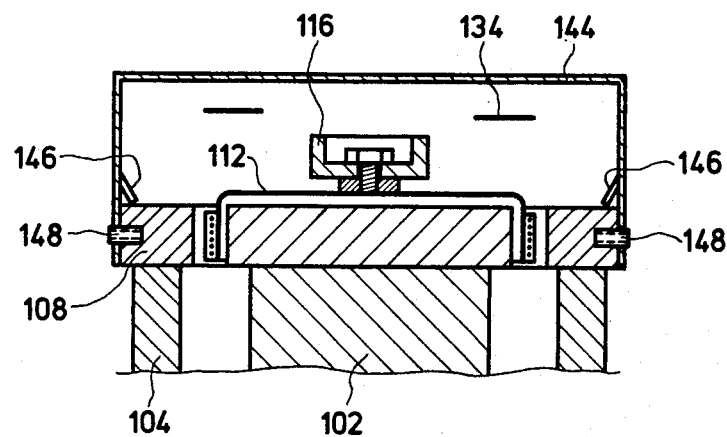
FIG. 5 is a detailed sectional view taken along line 5—5 of FIG. 4.

Referring now to the embodiment of FIGS. 4-6, the two-arm lever embodiment of the invention includes permanent magnet means 100 of the pot type having a cylindrical core member 102 about which is arranged in concentrially spaced relation a ferromagnetic annular member 104, said members being arranged between a ferromagnetic base plate 106 and a ferromagnetic cover plate 108. In this embodiment, the cover plate 108 contains the annular air gap 110 in which is arranged the compensation coil 114. The compensation coil 114 is mounted on the annular flange portion of a dish-shaped coil carrier member 112 that is formed of a non-ferromagnetic material, such as a synthetic plastic material. At one end of the apparatus, the scale pan carrier member 128 is connected with the permanent magnet means by upper and lower resilient guide means 134 which guide the scale pan carrier member 128 for vertical axial movement. The upper and lower guide means 134 have the configuration of an isosceles triangle the apex portion of which is connected with the associated end of the scale pan carrier member 128. At the base portion of the isosceles triangle, the upper guide means 134 is connected with the cover plate 108 by a pair of vertical columns 136 that support the horizontal stabilizing bar 142, and the lower guide means 134 is connected with the base plate 106 by a pair of vertical columns 136' that are stabilized by the horizontal strip 142.

The two-arm lever 116 is suspended intermediate its ends by means of suspension bearings 118 that are arranged between a pair of laterally spaced longitudinal extensions 120 from the cover plate 108 and pair of lateral extensions 122 from the two-arm lever. The right hand end of the lever is connected with the coil carrier member 112, and the pan carrier member 128 is suspended from the other end of the two-arm lever by the suspension bearing 124. As shown in FIG. 6, the two-arm lever 116 has the configuration of an isosceles triangle the apex portion of which is connected with the coil carrier member 112, and the base portion of which is connected with the cover plate 108 by the suspension bearings 118.

In accordance with the present invention, a ferromagnetic cover 144 defining the protective shield means is arranged in spaced relation above and extends completely across the air gap 110 and the compensation coil 114 arranged therein. As shown in FIG. 5, the cover member 144 has a generally U-shaped cross sectional configuration, the side portions of which contain inwardly bent lugs 146 that engage the upper surface of the cover plate 108, and the lower extremities of the side walls being connected with this cover plate by means of force-fit locking pins 148. Consequently, the protective shield member 144, which is formed of a ferromagnetic material, serves to protect air gap 110 and the coil 114 from stray magnetic flux and also from particles of impurities, thereby increasing the accuracy of measurement of the apparatus as well as its operating life.

Furthermore, as in the first embodiment, the protective shield member virtually closes the magnetic flux of the permanent pot magnet and thereby avoids magnetic interaction between said pot magnet and ferromagnetic particles above the apparatus.

While in accordance with the provisions of the Patent Statutes the preferred forms and embodiments of the invention have been illustrated and described, it will be apparent to those skilled in the art that various changes and modifications may be made without deviating from the inventive concepts set forth above. Consequently, balances which are not provided with transmission lever means could profitably be equipped with the protective shield means of the instant invention.

What is claimed is:

1. In a weighing apparatus of the electromagnet load compensation type including stationary pot-type permanent magnet means containing at one end an annular air gap which is open at one end; an annular compensation coil arranged asymmetrically relative to said permanent magnet means concentrically within the open end of said air gap; a movable pan carrier member connected for movement between normal no-load and load positions relative to said magnet means; means connecting said compensation coil with said pan carrier member; and means operable when the pan carrier member is displaced from said no-load position relative to said permanent magnet means for supplying compensation current to said compensation coil to return said pan carrier member to its no-load position;

the improvement which comprises protective shield means connected with said permanent magnet means and extending in spaced relation completely across the open end of said air gap and the compensation coil contained therein for shielding said coil against the effects of stray magnetic flux and particles of impurities, said protective shield means being formed of a ferromagnetic material and being connected in flux transmitting relation with said permanent magnet means; and further wherein the axis of said permanent magnet means is arranged vertically, said permanent magnet means including spaced parallel horizontal upper cover and lower base plates, one of said plates containing said annular air gap; and further wherein said means connecting said compensation coil with said pan carrier member includes a dish-shaped coil carrier member having an annular flange portion which extends within the open end of said air gap and upon which said compensation coil is mounted, said coil carrier member being arranged in protected relation between said protective shield means and said permanent magnet means.

2. Apparatus as defined in claim 1, wherein said pan carrier member is vertically arranged; and further including first guide means (34, 134) connecting said pan carrier member for vertical axial displacement relative to said permanent magnet means, at least a portion of said first guide means extending in the space between said protective shield means and said permanent magnet means.

3. Apparatus as defined in claim 2, and further including second guide means (62) for guiding said compensation coil for vertical movement relative to said permanent magnet means, at least a portion of said second guide means extending in the space between said protective shield means and said permanent magnet means.

4. Apparatus as defined in claim 1, wherein said air gap is contained in said base plate, said coil carrier member being arranged beneath said base plate with the flange portion thereof extending upwardly within said air gap.

5. Apparatus as defined in claim 4, wherein said means connecting said compensation coil with said pan carrier member further includes a vertical coil carrier rod (22) connected at its lower end with the center portion of said dish-shaped coil carrier member, said coil carrier rod extending upwardly through a vertical bore (20) contained in said permanent magnet means, one-arm lever means (46) connected at one end with the upper end of said coil carrier rod, the other end of said lever being connected with said permanent magnet means for pivotal movement about a horizontal axis, and means (50) connecting an intermediate portion of said one-arm lever means with said pan carrier member.

6. Apparatus as defined in claim 1, wherein said air gap is contained in said cover plate, said coil carrier member being arranged above said cover plate with the flange portion thereof extending downwardly within said air gap.

7. Apparatus as defined in claim 6, wherein said means connecting said compensation coil with said pan carrier member comprises two-arm lever means (116) connected at one end with said dish-shaped coil carrier member, an intermediate portion of said two-arm lever means being connected with said permanent magnet means for pivotal movement about a horizontal axis, and means (124) connecting the other end of said two-arm lever means with said pan carrier member.

* * * * *